United States Patent [19]

Maciejewski

[11] Patent Number: 5,561,640
[45] Date of Patent: *Oct. 1, 1996

[54] MULTI-SECTION SONAR ARRAY CABLE

[75] Inventor: Wendell C. Maciejewski, Salem, Conn.

[73] Assignee: The United States of America as represented by the Secretary of the Navy, Washington, D.C.

[*] Notice: The term of this patent shall not extend beyond the expiration date of Pat. No. 5,416,273.

[21] Appl. No.: 443,918

[22] Filed: May 22, 1995

[51] Int. Cl.$^6$ ..................................................... G01V 1/38
[52] U.S. Cl. ..................... 367/20; 367/154; 174/101.5; 174/86; 114/253
[58] Field of Search ................. 367/20, 154; 174/101.5, 174/86; 114/253

[56] References Cited

U.S. PATENT DOCUMENTS

| | | | |
|---|---|---|---|
| 3,639,864 | 2/1972 | Klostermark | 333/96 |
| 3,823,249 | 7/1974 | Floessel et al. | 174/21 C |
| 4,450,543 | 5/1984 | Neeley | 367/154 |
| 4,901,287 | 2/1990 | Hathaway et al. | 367/3 |
| 5,416,273 | 5/1995 | Maciejewski | 174/86 |

*Primary Examiner*—J. Woodrow Eldred
*Attorney, Agent, or Firm*—Michael J. McGowan; Michael F. Oglo; Prithvi C. Lall

[57] ABSTRACT

Sonar array cable is typically provided in lengths comprising hydrophone arrays and associated electronics and transmitter can components, each cable length or section having one of each of these components housed therein. These sections are relatively stiff and unbendable, requiring that they be connected with relatively bendable intermediate segments. These intermediate segments are susceptible to excessive bending that can lead to failure of the wiring provided therebetween. The wiring in these intermediate bendable segments is provided in the form of a coil, each of which coils is rigidly connected to the transmitter and electronics in one cable section, and the other end of the coil being connected electrically to the wiring associated with the hydrophone array in an adjacent cable section. Each coil is encased in relatively soft urethane material, preferably in one portion of the bendable segment, another portion of the bendable segment having the coil connected at its other end to a relatively stiff urethane material associated with the transmitter can and associated electronics.

4 Claims, 2 Drawing Sheets

MULTI-SECTION SONAR ARRAY CABLE

STATEMENT OF GOVERNMENT INTEREST

The invention described herein may be manufactured and used by or for the Government of the United States of America for governmental purposes without the payment of any royalties thereon or therefore.

CROSS REFERENCE TO RELATED APPLICATIONS

This application is related to a copending application Ser. No. 08/155,604 filed 28 November 1994 entitled STRAIN RELIEF FOR A FLEXIBLE WIRE FIXED JUNCTION filed by the same inventor as the inventor herein, and still pending before the U.S. Patent and Trademark Office.

BACKGROUND OF THE INVENTION

1. Field of the Invention

The present invention relates to providing sharp bend tolerant segments between relatively non-bendable cable sections in a multi-section sonar array cable. Multi-section sonar arrays have been known to suffer damage while being hauled aboard ship using a small radius capstan, or while being hauled manually over the rail of the ship. The non-bendable portions transfer the bending stresses to the bendable portions between the adjacent cable sections with the result that the electrical wires contained therein are flexed excessively and tend to fail prematurely as a result of repeated bending in the area of the joint between the adjacent cable sections.

2. Description of the Prior Art

Sectionalized marine seismic cable of the type having individual cable sections joined by articulated connector assemblies that permit relative bending movement between the individual cable sections are known. See U.S. Pat. No. 4,450,543 issued to Neeley in May of 1984. The Neeley patent disclosure illustrates relatively non-bendable cable sections articulated to intermediate elements or devices provided between adjacent cable sections. Each such element defines two distinct joints for each end of the adjacent cable sections. This requires a relatively large housing for these joints so that the wiring can be provided in a loose loop between the end of one cable section and the end of the adjacent cable section. The present invention seeks to obviate the need for an enlarged housing with two ball and socket style joints defined in the coupling element itself as suggested in Neeley.

Harris U.S. Pat. No. 3,459,873 is similar to the disclosure of Neeley in that relatively inflexible elements are connected by an intermediate housing defining two ball and socket joints with a loose wire provided therebetween. Here again the present invention seeks to obviate the need for a relatively rigid intermediate connecting link defining discrete pivotal joints for accommodating the bending required in the deployment and retrieval of a sonar array cable at sea.

Floessel U.S. Pat. No. 3,823,249 shows a conductor assembly comprising a number of relatively rigid straight sections arranged in end-to-end relationship, and connected to one another by short flexible sections that together accommodate bends of 180° by reason of each intermediate section containing a coil of wire adapted to bend through approximately 45°. Here again the intermediate bendable sections require considerable cable length to achieve the desired degree of bending. The present invention on the other hand accommodates a considerable bend angle, without sacrifice to excessively lengthening the overall cable in order to accommodate a plurality of such coupling elements or segments between adjacent non-bendable cable sections.

Klostermark U.S. Pat. No. 3,639,864 represents a typical prior art approach to providing flexibility in an otherwise relatively non-bendable cable of the type with which the present invention is adapted for use. However, in Klostermark the wiring provided between adjacent non-bendable cable sections must itself be flexed through approximately 180°. Such a configuration can lead to premature failure of the wire and damage to the surrounding cable, sleeve or covering hose.

The above-described prior art approaches to protecting the junction between relatively non-bendable cable sections and a relatively short cable coupling element or segment, such as would be connected between a hydrophone array in one cable section and electronically controlled transmitters in an adjacent cable section, all suffer from the disadvantage that the hinge or joint between the cable sections must be designed to fold, and that consequently the wiring provided inside these prior art coupling elements is subjected to bending at severe angles, repeated flexing, and abrupt changes in tension loads. Such severe handling of multi-section cable equipped with these prior arts coupling sub-assemblies takes its toll on the wires where the wires emerge from the relatively hard or stiff cable sections. Furthermore even the use of relatively soft polyurethane material in this area to alleviate such bending stresses has not eliminated this problem. Unless actual strain relief is afforded to the flexible wire at the juncture between it and relatively hard or stiff potting material failures can occur. Consequently, after relatively short periods of time in service, mechanical fatigue and consequent electrical failure of the wiring can be expected with such prior art solutions.

SUMMARY OF THE INVENTION

It is a general purpose and object of the present invention to provide cable coupling elements between adjacent non-bendable cable sections in a multi-section sonar array cable such that the assembly can be tolerant of sharp bending at least in the relatively flexible portion of these coupling elements to accommodate bending stresses on the cable sections when the sonar array cable is deployed from or retrieved by a sea going vessel.

The foregoing object is accomplished by the present invention in a sonar array cable having a plurality of non-bendable cable sections, each section including a hydrophone array together with appropriate wiring for that hydrophone array, and wherein each such cable section further includes a transmitter and associated electronics for an adjacent hydrophone array in an adjacent cable section. These cable sections are joined by a cable coupling segment between these adjacent cable sections to couple the cable sections both mechanically and electrically. Each such cable coupling segment has a first portion encased in the cable section that contains the transmitter and associated electronics, and this first portion is itself non-bendable as a result of being encased in that non-bendable cable section. Further, each cable coupling element or segment further includes a bendable second portion integrally connected to that first portion by a soft urethane material. The first portion is fabricated from a relatively hard material such as hard urethane that serve as a potting material for the hydrophone array wiring itself. A flexible wire coil in the form of a helix is provided in this soft urethane material and serves to electrically connected the hydrophone array wiring in one cable section to the transmitter and associated electronics in the adjacent cable section said copending application is incorporated by reference herein.

In its presently preferred form the cable coupling segment includes a strain relief configuration constructed in accordance with the teaching of the above-identified copending application entitled STRAIN RELIEF FOR FLEXIBLE WIRE AT FIXED JUNCTION identified by U.S. Ser. No. 08/155,604 filed 28 November 1994 and filed by the inventor herein.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
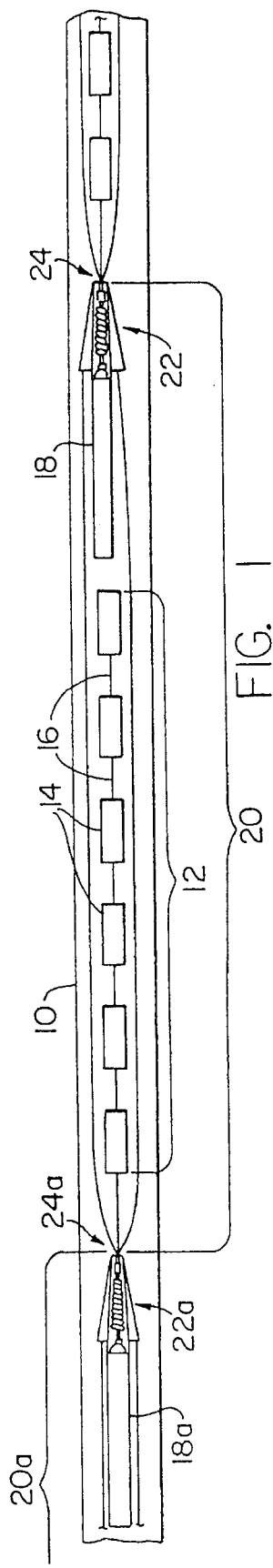
FIG. 1 is a sectional view taken through a multi-section sonar array cable constructed in accordance with the present invention.

Referring now to FIG. 1 in greater detail, a length of sonar array cable is there shown as comprising an outer covering or hose 10 which is preferably of uniform cross-sectional size, and which serves to protect the components contained within this outer covering or hose so as to protect these components from environmental damage both on board a vessel where the cable is stored, and during deployment of the cable at sea either from a capstan or over the rail of the vessel.

Still with reference to FIG. 1, the cable can be seen to include a plurality of hydrophone arrays, each hydrophone array 12 including a plurality of hydrophones 14, 14 arranged in series and interconnected by suitable wiring as indicated at 16. The wiring associated with the hydrophone array 12 is electrically connected to an electrical transmitter can and suitable electronics 18 in an adjacent hydrophone array assembly 20a which is or may be identical to the hydrophone array assembly indicated generally at 20 in FIG. 1. Thus, the transmitter can and electronics 18 must be electrically connected to the wiring associated with the hydrophone array in the adjacent cable section. In its presently preferred form the coupling means provided for both mechanically and electrically connecting these adjacent hydrophone array assemblies 20 and can 18 takes the form of a cable coupling element or segment 22a that is non-bendably or rigidly connected to the transmitter can and associated electronics 18.

It will be apparent that the cable coupling element or segments 22 and 22a are also electrically connected to the hydrophone array in an adjacent section of the multi-section cable as indicated generally at 24a and 24 respectively.

Figure 3:
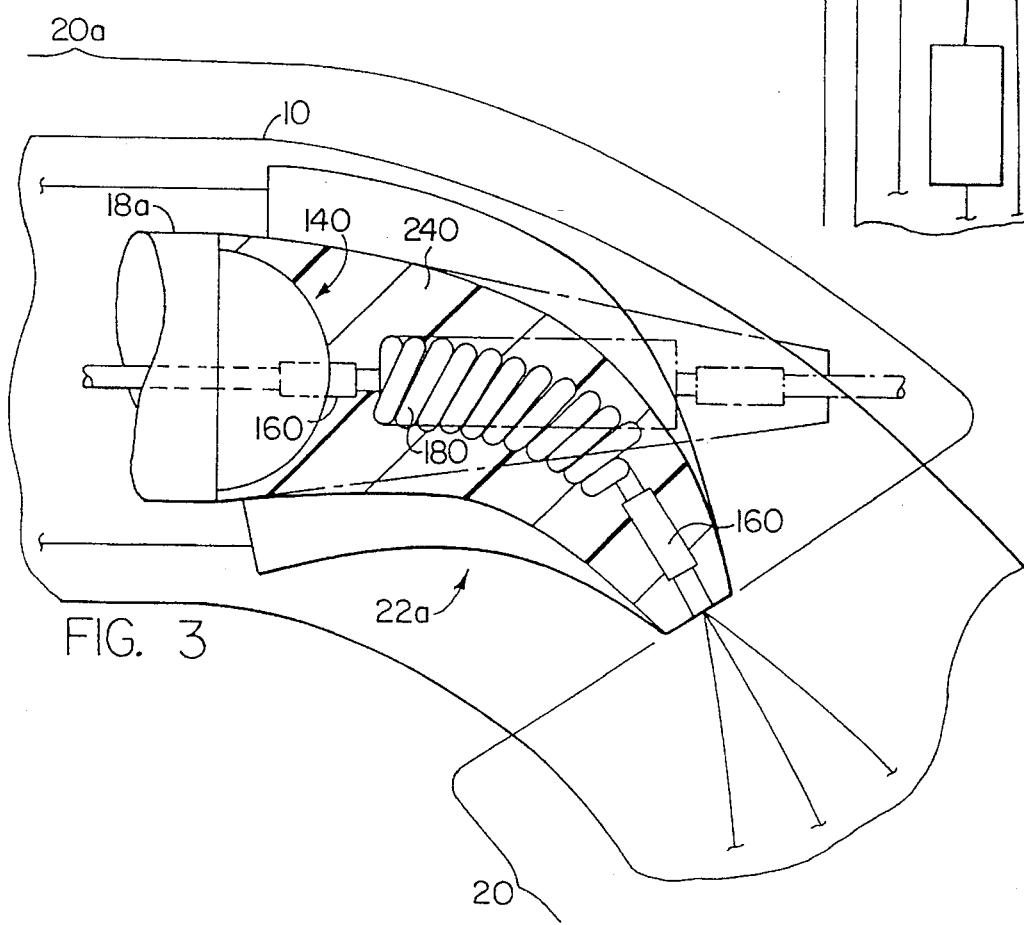
FIG. 3 is a detailed view of the coupling segment provided between the adjacent cable sections of FIG. 1.

In its presently preferred form the internal components of each cable coupling segment takes the form of a Strain Relief For Flexible Wire at Fixed Junction, all as described in the above-identified copending application bearing that title and identified previously as incorporated by reference herein. More particularly, and as shown in FIG. 3, such a junction when provided in a coupling element or segment of the cable as disclosed herein is adapted to accommodate bending up to at least 90° between the adjacent cable sections. See for example the assembly at FIG. 3 wherein the cable coupling segment 22a is shown in greater detail, and wherein the adjacent cable sections 20 and 20a are coupled to one another in a common hose covering or cable cover 10.

Figure 2:
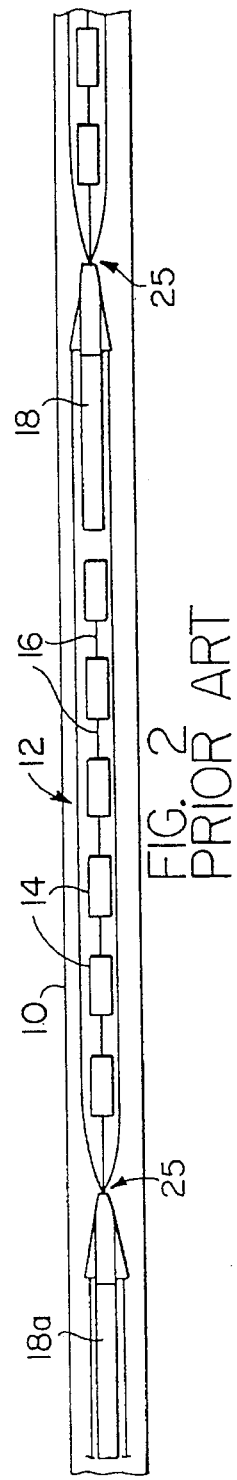
FIG. 2 is a sectional view of a prior art multi-section cable.

FIG. 2 shows a typical prior art sonar array cable with a multitude of sections that are interconnected between a transmitter can and associated electronics of one cable section and the upstream end of a hydrophone array assembly in an adjacent cable section. In such a prior art arrangement the wiring provided at the juncture between these cable sections as indicated generally at 25 is prone to fatigue and consequent failure of the wiring by reason of the repeated flexing of the adjacent cable sections with respect to one another during deployment and/or retrieval of the cable from and to a vessel. Typically, a relatively small diameter capstan is provided for this purpose on the vessel with the result that all the bending is accommodated at these points 25,25 leading to excessive fatigue of the wire in this portion of the cable.

Figure 4:
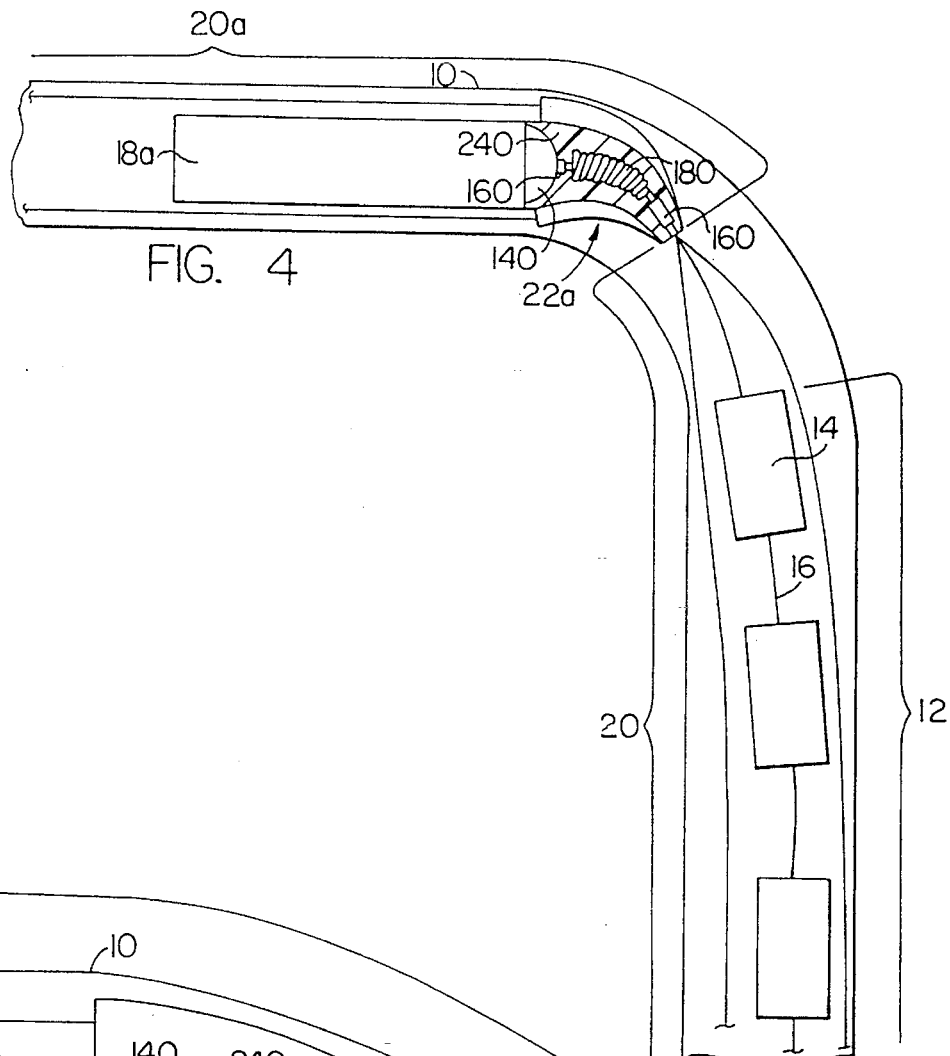
FIG. 4 is a view of the multi-section cable of FIG. 1 with two adjacent cable sections bent at approximately 90° with respect to one another.

Turning now to FIG. 4, adjacent cable sections 20 and 20a are shown oriented at approximately 90° with respect to one another. The actual bending of the wire provided between the coupling element 22 and the upstream end of the hydrophone array 22a is on the order of only 45° or less.

The cable coupling element or segment of FIG. 3 can be seen to have a first portion encased in the cable section containing the transmitter and associated electronics 18a. Thus, the free end of the helically shaped coil is integrally connected to the hydrophone array wiring by a first solder lug 160 and the other end of the helically shaped coil 180 is integrally connected by a similar solder lug 160 to the end of the transmitter can and associated electronics 18a in the adjacent cable section. The relatively rigid urethane potting material is indicated generally at 140 and is associated with a transmitter can as suggested in FIG. 4. The relatively soft urethane material 240 is adapted to bend, as is the coil contained therein, so as to afford a degree of flexibility for the coupling segment or element between the adjacent cable sections 20 and 20a.

Modifications and variations of the present invention will occur to those skilled in the art given the above teachings. For example, where the wiring is relatively small in diameter further protection from the environment can be afforded by encasing the helical coil in a bellows or the like such that the relatively soft urethane material is provided externally of the bellows and thereby need not come in direct contact with the helically shaped wire coil itself. The solder lugs suggested in the preferred embodiment may not be required in some installations, as for example where the wire is such that the coil shape can be formed in the wiring directly. The terms "bendable" and "non-bendable" as used in the appended claims are intended to convey the impression that the cable sections themselves are relatively rigid even thought they may bend slightly, and that most bending is accommodated at the coupling segment or element provided between these adjacent cable sections. Hence, the term "bendable" as used as applied to the coupling element or segment does not imply that the cable sections do not bend, but that the latter bend very little in comparison to these coupling segments.

In light of the above it is therefore understood that within the scope of the appended claims the invention may be practiced otherwise than as specifically described.

What is claimed is:

1. A sonar array cable comprising:

a plurality of non-bendable cable sections, each cable section having a hydrophone array and associated wiring;

each cable section further including a transmitter and associated electronics for an adjacent hydrophone array in an adjacent cable section;

cable coupling segments between said adjacent cable sections for connecting said sections both mechanically and electrically;

each cable coupling segment having a first portion encased in said cable section containing said transmitter and associated electronics, and said first portion being non-bendable as a result of being encased in said non bendable cable section;

each cable segment further including a bendable second portion integrally connected to said first portion by a soft urethane material, said first portion being of a hard urethane material that serves as a potting material for said hydrophone array wiring; and a flexible wire coil encased in said soft urethane material, said flexible wire coil electrically connecting said hydrophone array wiring in one cable section to said transmitter and associated electronics in said adjacent cable section.

2. The combination according to claim 1 wherein said flexible wire coil comprises a helical shape with a plurality of turns, said coil having one end integrally connected to said hydrophone array wiring by a first solder lug, an opposite end of said helical shaped coil integrally connected to said transmitter and associated electronics by a second solder lug whereby said coupling segments readily bend to avoid undue bending stresses on the cable sections when the multi-section cable array is deployed from or retrieved by a vessel.

3. The combination according to claim 2 wherein said cable sections and said cable coupling segments share a common cable cover or hose surrounding said hydrophone arrays, surrounding said transmitter and associated electronics, and surrounding said bendable and non-bendable cable coupling segments and cable sections whereby the sonar array cable is protected from environmental damage both on board the vessel and when deployed at sea.

4. The combination according to claim 3 wherein said helically shaped coil is adapted to absorb both bending and tension without incurring undue strain on the electrically conductive wire of the coil.

* * * * *